United States Patent
Massimini et al.

(10) Patent No.: US 12,527,478 B2
(45) Date of Patent: Jan. 20, 2026

(54) PREDICTING VESSEL COMPLIANCE RESPONSIVE TO MULTIPLE POTENTIAL TREATMENTS

(71) Applicant: BOSTON SCIENTIFIC SCIMED, INC., Maple Grove, MN (US)

(72) Inventors: Daniel Frank Massimini, Brooklyn Park, MN (US); Andrew David Bicek, Elk River, MN (US); Wenguang Li, Los Gatos, CA (US)

(73) Assignee: Boston Scientific Scimed, Inc., Maple Grove, MN (US)

( * ) Notice: Subject to any disclaimer, the term of this patent is extended or adjusted under 35 U.S.C. 154(b) by 445 days.

(21) Appl. No.: 18/143,481

(22) Filed: May 4, 2023

(65) Prior Publication Data
US 2023/0355106 A1    Nov. 9, 2023

Related U.S. Application Data

(60) Provisional application No. 63/339,258, filed on May 6, 2022.

(51) Int. Cl.
*A61B 5/02* (2006.01)
*A61B 5/00* (2006.01)
(Continued)

(52) U.S. Cl.
CPC ........ *A61B 5/02007* (2013.01); *A61B 5/0033* (2013.01); *A61B 5/4833* (2013.01);
(Continued)

(58) Field of Classification Search
CPC ......... G06T 7/0012; G06T 2207/10101; G06T 2207/10132; G06T 2207/20084; G06T 2207/30101; G06T 2207/30104; A61B 5/02007; A61B 5/0033; A61B 5/0066; A61B 5/0075; A61B 5/0084;
(Continued)

(56) References Cited

U.S. PATENT DOCUMENTS

| | | | | |
|---|---|---|---|---|
| 5,711,303 | A * | 1/1998 | Shimizu | A61B 5/022 600/490 |
| 7,371,067 | B2 * | 5/2008 | Anderson | A61F 2/07 700/98 |

(Continued)

FOREIGN PATENT DOCUMENTS

| | | | |
|---|---|---|---|
| WO | 2021062006 A1 | 4/2021 | |
| WO | 2021193015 A1 | 9/2021 | |
| WO | WO-2025106526 A2 * | 5/2025 | ............. G16H 50/50 |

OTHER PUBLICATIONS

International Search Report and Written Opinion dated Aug. 8, 2023 for International Application No. PCT/US2023/021049.

*Primary Examiner* — Scott A Rogers
(74) *Attorney, Agent, or Firm* — Seager, Tufte & Wickhem, LLP

(57) ABSTRACT

The present disclosure provides apparatus and methods to both infer stent expansion (vessel expansion or compliance) and probability of procedural success (vessel patency) from pretreatment diagnostic imaging at the point-of-care and also train an inference model to generate such an inference, thus allowing a physician to choose with greater certainty an optimal treatment tool and treatment protocol for treating a vessel of a patient.

20 Claims, 11 Drawing Sheets

| Treatment Protocol | Predicted Vessel Expansion |
|---|---|
| No Treatment | 12% |
| POBA | 68% |
| Cutting and/or Scoring | 78% |
| High Pressure Balloon | 92% |
| Intravascular Lithoplasty | 94% |

(51) Int. Cl.
*A61B 8/00* (2006.01)
*A61B 8/08* (2006.01)
*A61B 8/12* (2006.01)
*A61B 34/10* (2016.01)
*A61B 90/00* (2016.01)
*G06T 7/00* (2017.01)
*G16H 20/40* (2018.01)
*G16H 30/40* (2018.01)

(52) U.S. Cl.
CPC ............ *A61B 5/4848* (2013.01); *A61B 5/489* (2013.01); *A61B 5/743* (2013.01); *A61B 8/0891* (2013.01); *A61B 8/12* (2013.01); *A61B 8/5223* (2013.01); *A61B 34/10* (2016.02); *G06T 7/0012* (2013.01); *G16H 20/40* (2018.01); *G16H 30/40* (2018.01); *A61B 5/0066* (2013.01); *A61B 5/0075* (2013.01); *A61B 5/0084* (2013.01); *A61B 5/0086* (2013.01); *A61B 8/445* (2013.01); *A61B 8/4494* (2013.01); *A61B 2034/104* (2016.02); *A61B 2034/105* (2016.02); *A61B 2090/3735* (2016.02); *A61B 2090/3784* (2016.02); *G06T 2207/10101* (2013.01); *G06T 2207/10132* (2013.01); *G06T 2207/20084* (2013.01); *G06T 2207/30101* (2013.01); *G06T 2207/30104* (2013.01)

(58) Field of Classification Search
CPC ... A61B 5/0086; A61B 5/4833; A61B 5/4848; A61B 5/489; A61B 5/743; A61B 8/0891; A61B 8/12; A61B 8/445; A61B 8/4494; A61B 8/5223; A61B 34/10; A61B 2034/104; A61B 2034/105; A61B 2090/3735; A61B 2090/3784; G16H 20/40; G16H 30/40
See application file for complete search history.

(56) References Cited

U.S. PATENT DOCUMENTS

| | | | |
|---|---|---|---|
| 10,335,042 B2* | 7/2019 | Schoenle | A61B 8/12 |
| 10,354,759 B2* | 7/2019 | Taylor | G06F 30/20 |
| 11,328,412 B2* | 5/2022 | Zhou | G16H 50/70 |
| 11,883,107 B2* | 1/2024 | Gopinath | A61B 8/466 |
| 2012/0130242 A1* | 5/2012 | Burgess | A61B 8/12 |
| | | | 600/443 |
| 2016/0038004 A1* | 2/2016 | Tanaka | A61B 90/37 |
| | | | 600/371 |
| 2019/0282182 A1 | 9/2019 | Scott et al. | |
| 2019/0365480 A1* | 12/2019 | Gopinath | A61B 5/4851 |
| 2023/0012527 A1* | 1/2023 | Iguchi | G16H 50/70 |
| 2024/0032801 A1* | 2/2024 | Coates | A61B 5/1076 |
| 2024/0065667 A1* | 2/2024 | Jatautas | A61B 8/0858 |
| 2024/0415392 A1* | 12/2024 | Denny | G06T 7/00 |
| 2025/0025056 A1* | 1/2025 | Igarashi | G06T 7/62 |
| 2025/0134393 A1* | 5/2025 | Phillips | A61B 5/02014 |

* cited by examiner

| Treatment Protocol | Predicted Vessel Expansion |
|---|---|
| No Treatment | 12% |
| POBA | 68% |
| Cutting and/or Scoring | 78% |
| High Pressure Balloon | 92% |
| Intravascular Lithoplasty | 94% |

PREDICTING VESSEL COMPLIANCE RESPONSIVE TO MULTIPLE POTENTIAL TREATMENTS

CROSS-REFERENCE TO RELATED APPLICATIONS

This application claims the benefit of priority under 35 U.S.C. § 119 of U.S. Provisional Application No. 63/339,258, filed May 6, 2022, the entire disclosure of which is hereby incorporated by reference.

TECHNICAL FIELD

The present disclosure pertains to medical devices and/or medical device systems. More particularly, the present disclosure pertains to medical device systems for predicting vessel compliance to a treatment.

BACKGROUND

A wide variety of intracorporeal medical devices have been developed for medical use, for example, intravascular use. Some of these devices include guidewires, catheters, and the like. These devices are manufactured by any one of a variety of different manufacturing methods and may be used according to any one of a variety of methods. Of the known medical devices and methods, each has certain advantages and disadvantages. There is an ongoing need to determine whether treatments using such devices or methods will be successful. For example, in the context of intravascular use, there is a need to predict or even improve the compliance of the vessel to increase the effectiveness or improve the outcome of treatment.

BRIEF SUMMARY

An intravascular imaging system arranged to capture diagnostic images of a patient's vessel and to infer, at the point-of-care, from the diagnostic images based on an inference model, a probability of vessel expansion for a number of treatment protocols is provided. It is to be appreciated that point-of-care vessel compliance is difficult to predict a priori, yet it is essential to improve vessel compliance. This is particularly true when the vessel includes high calcium lesions.

In one embodiment, a method for predicting vessel compliance includes: receiving, at a computing device from an intravascular imaging device, a plurality of images associated with a vessel of a patient, the plurality of images including multidimensional and multivariate images; identifying, by the computing device, a probability of expansion of the vessel for each of a plurality of treatment protocols based on an inference model and the plurality of images; generating, by the computing device, a graphical information element that includes an indication of the plurality of treatment protocols and the identified probabilities of expansion; and causing, by the computing device, the graphical information element to be displayed on a display coupled to the computing device.

With some embodiments, identifying the probability of expansion of the vessel for each of the plurality of treatment protocols includes providing the plurality of images as inputs to the inference model, and executing the inference model to generate the probability of expansion of the vessel for each of the plurality of treatment protocols.

With some embodiments, the plurality of treatment protocols includes a first treatment protocol and a second treatment protocol and the inference model includes a first inference model. In such embodiments, the method includes providing the plurality of images as inputs to the first inference model, executing the first inference model to generate the probability of expansion of the vessel for the first treatment protocol, providing the plurality of images as inputs to a second inference model, and executing the second inference model to generate the probability of expansion of the vessel for the second treatment protocol.

With some embodiments, the inference model is a convoluted neural network (CNN).

With some embodiments, the graphical information element includes a table that includes an indication of each of the treatment protocols and the identified probability of expansion.

With some embodiments, identifying, by the computing device, the probability of expansion of the vessel for each of the plurality of treatment protocols based on the inference model and the plurality of images includes identifying the probability of expansion relative to a treatment parameter.

With some embodiments, the intravascular imaging device is an intravascular ultrasound (IVUS) device, optical coherence tomography (OCT) device, an optical coherence elastography (OCE) device, or a spectroscopy device. With some embodiments, the vessel of the patient includes a lesion. With some embodiments, the vessel of the patient includes a calcified lesion.

In another embodiment, an apparatus includes: a processor arranged to be coupled to an intravascular imaging device and a memory device storing instructions and an inference model, where the processor is arranged to execute the instructions to implement the method of any one of the above examples.

With another embodiment, a computing apparatus, includes a processor. The computing apparatus also includes a memory device storing instructions that, when executed by the processor, configure the apparatus to: receive, from an intravascular imaging device, a plurality of images associated with a vessel of a patient, the plurality of images include multidimensional and multivariate images; identify a probability of expansion of the vessel for each of a plurality of treatment protocols based on an inference model and the plurality of images; generate a graphical information element includes an indication of the plurality of treatment protocols and the identified probabilities of expansion; and cause the graphical information element to be displayed on a display coupled to the computing device.

With some embodiments, the instructions when executed by the processor to identify the probability of expansion of the vessel for each of the plurality of treatment protocols includes providing the plurality of images as inputs to the inference model and executing the inference model to generate the probability of expansion of the vessel for each of the plurality of treatment protocols.

With some embodiments, the plurality of treatment protocols include a first treatment protocol and a second treatment protocol and the inference model includes a first inference model. In such embodiments, the instructions when executed by the processor cause the apparatus to provide the plurality of images as inputs to the first inference model, execute the first inference model to generate the probability of expansion of the vessel for the first treatment protocol, provide the plurality of images as inputs to a second inference model, and execute the second inference model to generate the probability of expansion of the vessel for the second treatment protocol.

With some embodiments, the inference model is a convoluted neural network (CNN).

With some embodiments, the graphical information element includes a table, which includes an indication of each of the treatment protocols and the identified probability of expansion.

With some embodiments, the instructions when executed by the processor to identify the probability of expansion of the vessel for each of the plurality of treatment protocols based on the inference model and the plurality of images includes identifying the probability of expansion relative to a treatment parameter.

With some embodiments, the intravascular imaging device is an intravascular ultrasound (IVUS) device, an optical coherence tomography (OCT) device, an optical coherence elastography (OCE) device, or a spectroscopy device.

With some embodiments, the vessel of the patient includes a lesion.

With some embodiments, the vessel of the patient includes a calcified lesion.

In yet another embodiment, a method includes: receiving at a computing device, a plurality of sets of images, each set of images of the plurality of sets of images associated with a vessel of a patient of a respective one of a plurality of patients and includes a plurality of images of the vessel of the respective patient, the plurality of images includes multidimensional and multivariate images; generating, at the computing device, a virtual model of the vessel for each patient of the plurality of patients; simulating, by the computing device, performance of a plurality of treatment protocols on the plurality of virtual models; generating, by the computing device responsive to the simulation, results including an indication of vessel expansion due to the plurality of treatment protocols; and training, by the computing device, an inference model to infer an amount of vessel expansion for a vessel of a patient based on the plurality of images of the plurality of sets of images and the generated results.

With still another embodiment, a non-transitory computer-readable storage medium including instructions that when executed by a computer, cause the computer to: receive, at a computing device from an intravascular imaging device, a plurality of images associated with a vessel of a patient, the plurality of images including multidimensional and multivariate images; identify, by the computing device, a probability of expansion of the vessel for each of a plurality of treatment protocols based on an inference model and the plurality of images; generate, by the computing device, a graphical information element including an indication of the plurality of treatment protocols and the identified probabilities of expansion; and cause, by the computing device, the graphical information element to be displayed on a display coupled to the computing device.

With some embodiments, the computer-readable storage medium may also include instructions that when executed by a computer, further cause the computer to provide the plurality of images as inputs to the inference model, and execute the inference model to generate the probability of expansion of the vessel for each of the plurality of treatment protocols.

With some embodiments, the plurality of treatment protocols comprise a first treatment protocol and a second treatment protocol and the inference model includes a first inference model. In such embodiments, the computer-readable storage medium includes instructions that when executed by a computer, further cause the computer to provide the plurality of images as inputs to the first inference model, execute the first inference model to generate the probability of expansion of the vessel for the first treatment protocol, provide the plurality of images as inputs to a second inference model, and execute the second inference model to generate the probability of expansion of the vessel for the second treatment protocol.

With some embodiments, the inference model is a convoluted neural network (CNN) trained with a training set that includes a plurality of sub-sets of training images, each of the sub-sets of training images includes multidimensional and multivariate images of a vessel of a plurality of vessels, where the training images of each sub-set are associated with a probability of vessel expansion for each of the plurality of treatment protocols based on simulated treatment outcomes of the plurality of vessels.

In some embodiments, a method includes: receiving at a computing device, a plurality of sets of diagnostic images, each set of diagnostic images of the plurality of sets of diagnostic images associated with a vessel of a patient of a respective one of a plurality of patients and a plurality of diagnostic images of the vessel of the respective patient, where the vessel of the plurality of patients has been treated with a vessel expansion treatment protocol; receiving at the computing device, for the patients of the plurality of patients, a treatment result for the vessel expansion treatment protocol, the treatment result including an indication of vessel expansion; and training, by the computing device, an inference model to infer an amount of vessel expansion for a vessel of a patient based on the plurality of diagnostic images of the plurality of sets of diagnostic images and the treatment results.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
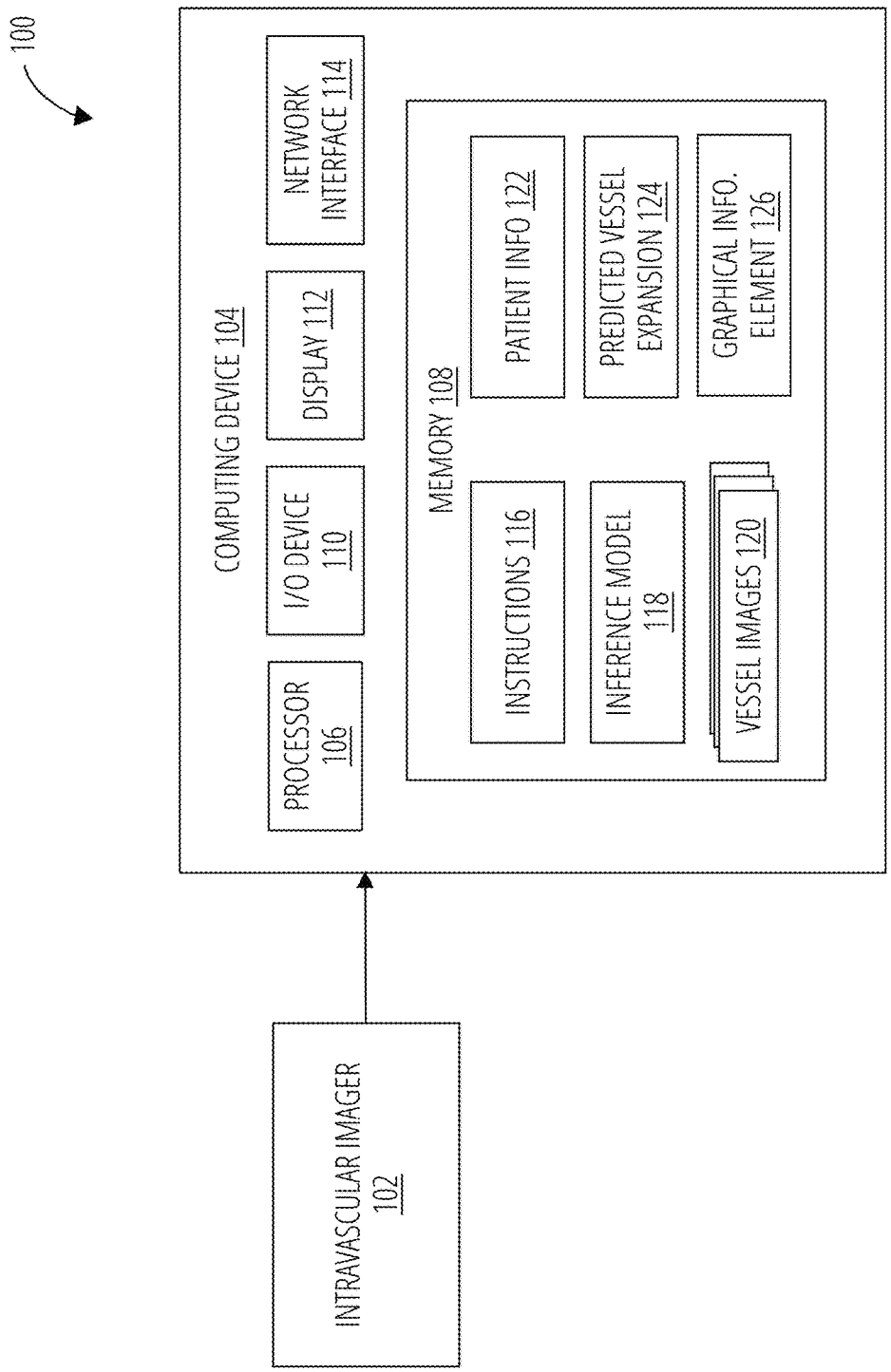
FIG. 1 illustrates an intravascular treatment system in accordance with an embodiment.

Numerous tools are on the market to treat vascular lesions including: plain old balloon angioplasty (POBA), atherectomy, cutting or scoring balloons, high pressure balloons, and intravascular lithoplasty. The intent of these tools is to improve the vascular compliance prior to stenting to achieve maximum lumen expansion and vessel patency. However, it can be difficult to improve the vascular patency of severely calcified vascular lesions.

Physiological assessment of vascular lesions, such as, for example, using fractional flow reserve (FFR), diastolic hyperemia-free ratio (DFR) and instantaneous wave-free ratio (iFR), along with imaging modalities such as magnetic resonance imaging (MRI), computerized tomography (CT), intravascular ultrasound (IVUS), optical coherence tomography (OCT), optical coherence elastography (OCE) and spectroscopy can give insight to the degree that a vascular lesion varies from healthy tissue. However, while there is some clinical agreement on physiology measurements and the need to treat vascular lesions, individual physicians choose which tools and methods are used to restore a vessel patency.

Imaging may help the physician determine relative amounts of soft and hard tissues, then based on experience and general guidance, select a tool or tools to complete a procedure to restore vessel patency. This approach has manifested in numerous clinical algorithms (IVUS and OCT calcium scores) that aim to distill multivariate data within the image into simple "scores" to help the physician select the treatment strategy. Additionally, some imaging modalities can provide tissue type identification. The physician can then use the identified tissue type as a surrogate for disease complexity burden and choose the most appropriate tool for the tissue. For example, atherectomy for calcified tissue and cutting/scoring balloons for fibrotic tissue.

However, despite use of the above described assessments and imaging modalities, there remain some lesions that are overtreated and other lesions that are undertreated. That is, none of these assessment or imaging modalities provides the physician with a quantitative prediction of vessel compliance and probability of successful outcome (vessel patency) at point-of-care from pretreatment diagnostic imaging and assessment.

It is to be appreciated that there are numerous challenges to determining or predicting vessel compliance. For example, calcium is difficult to see angiographically resulting in difficulty identifying severely calcified lesions. In particular, angiography is a two-dimensional (2D) representation of a three-dimensional (3D) anatomy. Both IVUS and OCT flatten the 3D data into 2D images to simplify visualization, resulting in distortion of the anatomy. Additionally, the correlation between calcium burden and vessel compliance is week, resulting in difficulty forming a quantitative assessment of severely calcified lesions.

Complicating the above factors is the fact that the human brain has limited ability to process multidimensional multivariate data, leading to clinical algorithms based on simplified and incomplete univariate approximations. That is, as the physician is expected to process pre-treatment imaging and assessment data and make a treatment tool and method decision at the point-of-care, the assessments and imaging data presented to the physician should be simplified. Such simplified assessments and imaging data often ignores morphology that effects vessel compliance, such as, for example, arc (degrees) of calcium, thickness of calcium, depth of calcium, length of calcium, interconnectedness of calcium, strength of calcium, etc.

The present disclosure provides, at the point-of-care, a prediction of stent expansion (vessel expansion or compliance) and probability of procedural success (vessel patency) from pretreatment diagnostic imaging. Thus, allowing the physician to choose with greater certainty the optimal treatment tool and methodology for the patient.

FIG. 1 illustrates an intravascular treatment system 100, in accordance with an embodiment of the present disclosure. In general, intravascular treatment system 100 is a system for predicting, at the point-of-care, vessel expansion (e.g., stent expansion or vessel compliance) and probability of procedural success (e.g., vessel patency) from pretreatment diagnostic images. To that end, intravascular treatment system 100 includes intravascular imager 102 and computing device 104. Intravascular imager 102 can any of a variety of intravascular imagers (e.g., IVUS, OCT, OCE, or the like). In a specific example, the intravascular imager 102 can be the intravascular treatment system 200 described with reference to FIG. 2A below.

During operation, computing device 104 can receive images of a vessel (e.g., vessel images 120) from intravascular imager 102 and can generate predicted vessel expansion 124 and graphical information element 126 comprising indications of predicted vessel expansion 124. Further, computing device 104 can cause graphical information element 126 to be rendered on display 112 at the point-of-care (e.g., during pre-treatment) such that a physician can make a determination on a suitable treatment protocol to increase the patency of the vessel.

During use, intravascular imager 102 can generate information elements, or data, including multidimension and multivariate images of a vessel of a patient. Computing device 104 is communicatively coupled to intravascular imager 102 and can receive this data including the indications of vessel images 120 from intravascular imager 102. In general, vessel images 120 can include indications of a shape of the vessel, a tissue type of the vessel, a lesion in the vessel, and/or a composition of the lesion in the vessel. Such data can include landmarks, surfaces, boundaries of three-dimensional points. With some examples, vessel images 120 can be constructed from two-dimensional (2D) or three-dimensional (3D) images of the vessel. In some embodiments, vessel images 120 can be a medical image. The term "image" is used herein for clarity of presentation and to imply that vessel images 120 represents the structure and anatomy of the vessel and a lesion in the vessel. However, it is to be appreciated that the term "image" is not to be limiting. That is, vessel images 120 may not be an image as conventionally used, or rather, an image viewable and interpretable by a human. For example, vessel images 120 can be a point cloud, a parametric model, a voxel model, or other morphological description of the vessel. Furthermore, vessel images 120 can be a single image or a series of images. As a specific example, vessel images 120 can comprise images in the digital imaging and communications in medicine (DICOM) standard.

With some embodiments, vessel images 120 can be processed (e.g., by processor 106 executing instructions 116, or the like), to for example, extract information from the images such as, lumen geometry, a calcium map, or the like. The images along with the extracted information can be included in, and generally, referred to herein, as vessel images 120. That is, the processes described herein to infer predicted vessel expansion 124 from vessel images 120 via inference model 118 can include inferring the vessel expansion from the images and/or the extracted lumen geometry and calcium map.

Computing device 104 can be any of a variety of computing devices. In some embodiments, computing device 104 can be incorporated into and/or implemented by a console of intravascular imager 102. With some embodiments, computing device 104 can be a workstation or server communicatively coupled to intravascular imager 102. With still other embodiments, computing device 104 can be provided by a cloud based computing device, such as, by a computing as a service system accessibly over a network (e.g., the Internet, an intranet, a wide area network, or the like). Computing device 104 can include processor 106, memory 108, input and/or output (I/O) device 110, and network interface 114.

The processor 106 may include circuitry or processor logic, such as, for example, any of a variety of commercial processors. In some examples, processor 106 may include multiple processors, a multi-threaded processor, a multi-core processor (whether the multiple cores coexist on the same or separate dies), and/or a multi-processor architecture of some other variety by which multiple physically separate processors are in some way linked. Additionally, in some examples, the processor 106 may include graphics processing portions and may include dedicated memory, multiple-threaded processing and/or some other parallel processing capability. In some examples, the processor 106 may be an application specific integrated circuit (ASIC) or a field programmable integrated circuit (FPGA).

The memory 108 may include logic, a portion of which includes arrays of integrated circuits, forming non-volatile memory to persistently store data or a combination of non-volatile memory and volatile memory. It is to be appreciated, that the memory 108 may be based on any of a variety of technologies. In particular, the arrays of integrated circuits included in memory 108 may be arranged to form one or more types of memory, such as, for example, dynamic random access memory (DRAM), NAND memory, NOR memory, or the like.

I/O devices 110 can be any of a variety of devices to receive input and/or provide output. For example, I/O devices 110 can include, a keyboard, a mouse, a joystick, a foot pedal, a haptic feedback device, an LED, or the like. Display 112 can be a conventional display or a touch-enabled display. Further, display 112 can utilize a variety of display technologies, such as, liquid crystal display (LCD), light emitting diode (LED), or organic light emitting diode (OLED), or the like.

Network interface 114 can include logic and/or features to support a communication interface. For example, network interface 114 may include one or more interfaces that operate according to various communication protocols or standards to communicate over direct or network communication links. Direct communications may occur via use of communication protocols or standards described in one or more industry standards (including progenies and variants). For example, network interface 114 may facilitate communication over a bus, such as, for example, peripheral component interconnect express (PCIe), non-volatile memory express (NVMe), universal serial bus (USB), system management bus (SMBus), SAS (e.g., serial attached small computer system interface (SCSI)) interfaces, serial AT attachment (SATA) interfaces, or the like. Additionally, network interface 114 can include logic and/or features to enable communication over a variety of wired or wireless network standards (e.g., 802.11 communication standards). For example, network interface 114 may be arranged to support wired communication protocols or standards, such as, Ethernet, or the like. As another example, network interface 114 may be arranged to support wireless communication protocols or standards, such as, for example, Wi-Fi, Bluetooth, ZigBee, LTE, 5G, or the like.

Memory 108 can include instructions 116, inference model 118, vessel images 120, patient information 122, predicted vessel expansion 124, and graphical information element 126. During operation, processor 106 can execute instructions 116 to cause computing device 104 to receive vessel images 120 from intravascular imager 102. In general, vessel images 120 are multi-dimensional multivariate images comprising indications of the vessel type, a lesion in the vessel, the lesion type, stent detection, the lumen border, the lumen dimensions, the minimum lumen area (MLA), the media border (e.g., a media border for media within the blood vessel), the media dimensions, the calcification angle/arc, the calcification coverage, combinations thereof, and/or the like.

Processor 106 can further execute instructions 116 and/or inference model 118 to generate predicted vessel expansion 124 from vessel images 120, and optionally vessel images 120 and patient information 122. Further, processor 106 can execute instructions 116 to generate graphical information element 126 from predicted vessel expansion 124 and cause graphical information element 126 to be rendered on display 112.

Inference model 118 can be any of a variety of machine learning (ML) models. In particular, inference model 118 can be an image classification model, such as, a neural network (NN), a convolutional neural network (CNN), a random forest model, or the like. Inference model 118 is arranged to infer predicted vessel expansion 124 from vessel images 120 or vessel images 120 and patient information 122. Said differently, inference model 118 can infer a probability of vessel expansion from a plurality of images of a vessel. Training of inference model 118 is described in greater detail below. However, it is noted that in general, inference model 118 is trained to generate predicted vessel expansion 124 as output when provided vessel images 120 or vessel images 120 and patient information 122 as inputs.

Processor 106 can execute instructions 116 to receive vessel images 120 from intravascular imager 102, receive patient information 122 from display I/O device 110, and to generate predicted vessel expansion 124 from vessel images 120 and/or patient information 122. In particular, processor 106 can execute instructions 116 and/or inference model 118 to generate predicted vessel expansion 124 from vessel images 120. In general, predicted vessel expansion 124 can include a prediction of vessel expansion for a number of treatment protocols (e.g., POBA, atherectomy, cutting and/or scoring balloons, high pressure balloons, intravascular lithoplasty, etc.). Said differently, for each of the several treatments, a probability of expansion of the vessel can be generated. It is to be appreciated that the probability of expansion for one treatment protocol (e.g., POBA) will be different than the probability of expansion for another treatment (e.g., cutting and/or scoring balloons).

Figure 2A:
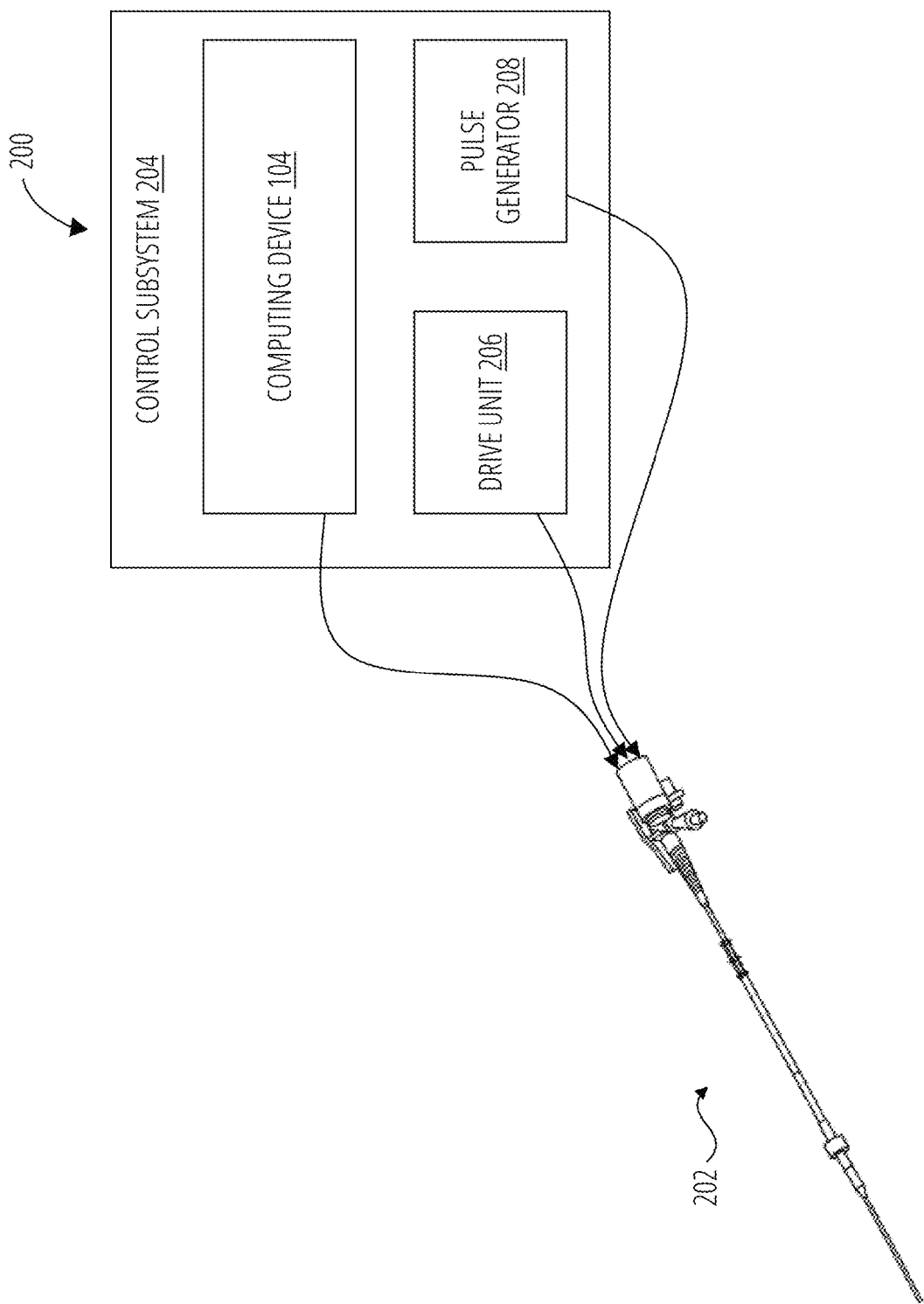
FIG. 2A illustrates another intravascular treatment system in accordance with another embodiment.
Figure 2B:
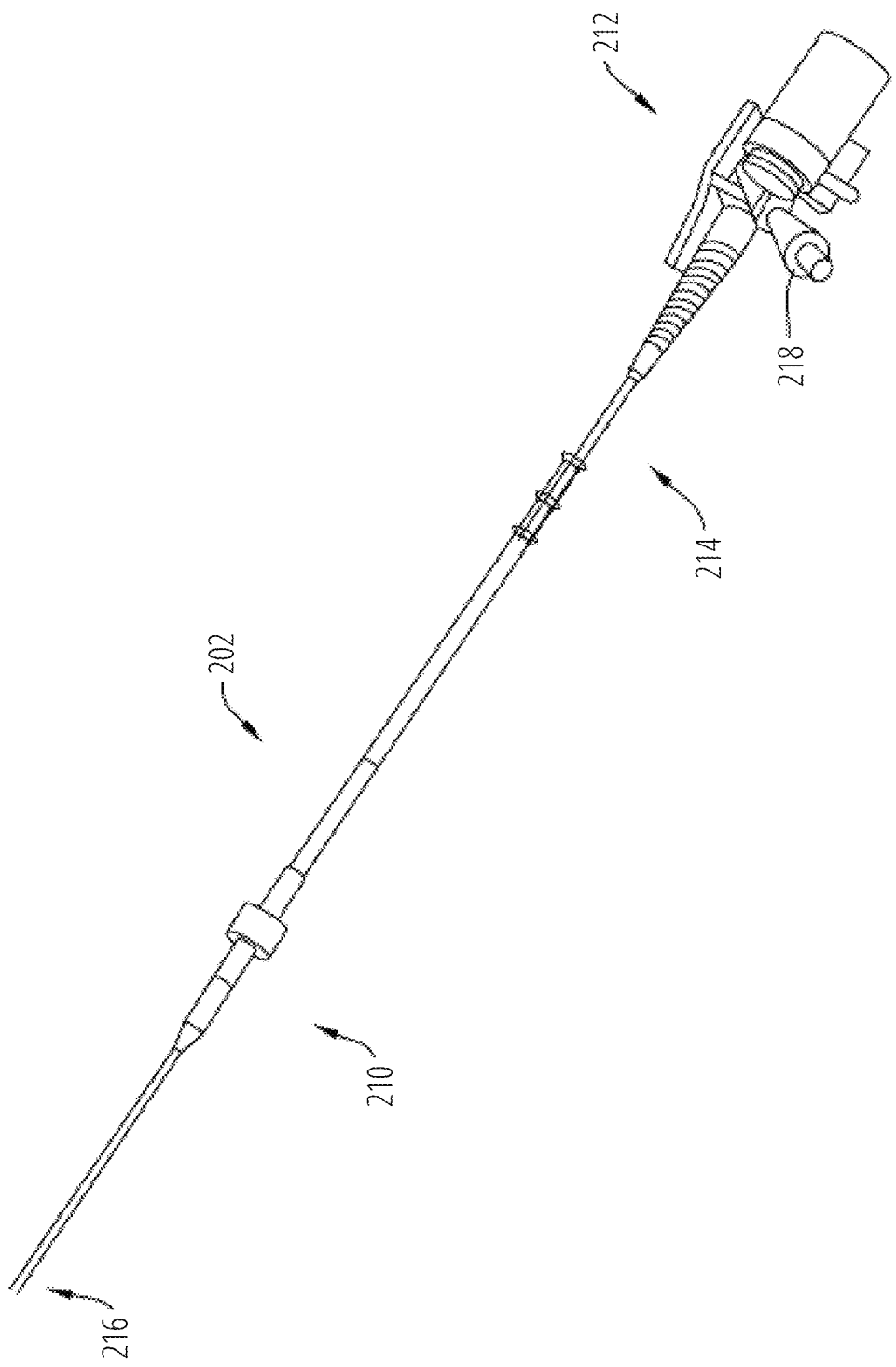
FIG. 2B illustrates a portion of the intravascular treatment system of FIG. 2A.
Figure 2C:
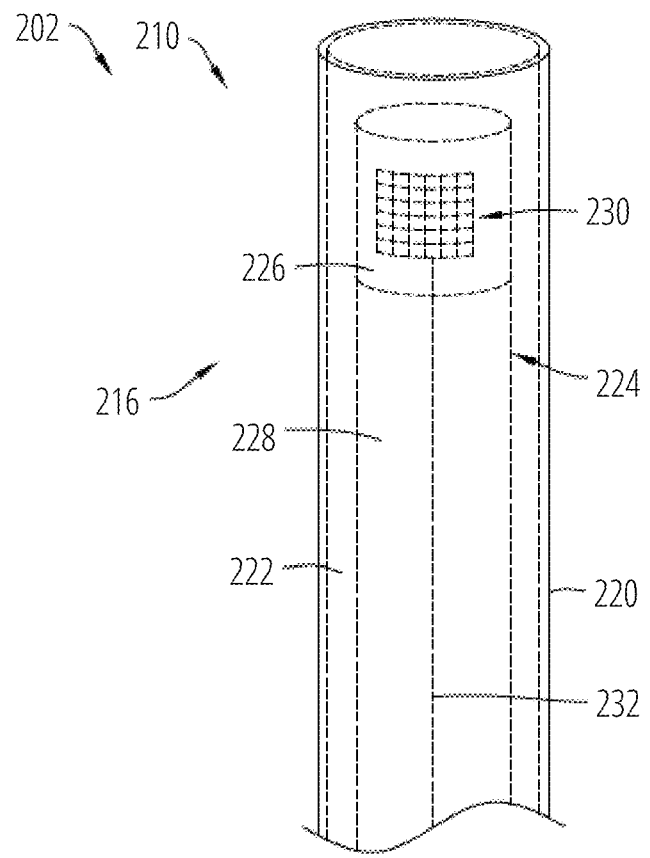
FIG. 2C illustrates a portion of the intravascular treatment system of FIG. 2A.

FIG. 2A, FIG. 2B, and FIG. 2C illustrate an example intravascular treatment system 200 and are described together herein. In particular, FIG. 2A is a component level view while FIG. 2B and FIG. 2C are side and perspective views, respectively, of a portion of the intravascular treatment system 200 of FIG. 2A. The intravascular treatment system 200 takes the form of an IVUS imaging system and can be implemented as the intravascular treatment system 100 of FIG. 1. The intravascular treatment system 200 includes a catheter 202 and a control subsystem 204. The control subsystem 204 includes the computing device 104, a drive unit 206 and a pulse generator 208. The catheter 202 and control subsystem 204 are operably coupled, or more specifically, the catheter 202 is electrically and/or mechanically coupled to the computing device 104, drive unit 206, and pulse generator 208 such that signals (e.g., control, measurement, image data, or the like) can be communicated between the catheter 202 and control subsystem 204.

It is noted that the computing device 104 includes display 112. However, in some applications, display 112 may be provided as a separate unit from computing device 104, for example, in a different housing, or the like. In some instances, the pulse generator 208 forms electric pulses that may be input to one or more transducers 230 disposed in the catheter 202.

In some instances, mechanical energy from the drive unit 206 may be used to drive an imaging core 224 disposed in the catheter 202. In some instances, electric signals transmitted from the one or more transducers 230 may be input to the processor 106 of computing device 104 for processing as outlined here. For example, to be used to generate predicted vessel expansion 124 and graphical information element 126. In some instances, the processed electric signals from the one or more transducers 230 can also be displayed as one or more images on the display 112.

In some instances, the processor 106 may also be used to control the functioning of one or more of the other components of control subsystem 204. For example, the processor 106 may be used to control at least one of the frequency or duration of the electrical pulses transmitted from the pulse generator 208, the rotation rate of the imaging core 224 by the drive unit 206, the velocity or length of the pullback of the imaging core 224 by the drive unit 206, or one or more properties of one or more images formed on the display 112, such as, the predicted vessel expansion 124 and graphical information element 126.

FIG. 2B is a side view of one embodiment of the catheter 202 of the intravascular treatment system 200 of FIG. 2A. The catheter 202 includes an elongated member 210 and a hub 212. The elongated member 210 includes a proximal end 214 and a distal end 216. In FIG. 2B, the proximal end 214 of the elongated member 210 is coupled to the catheter hub 212 and the distal end 216 of the elongated member 210 is configured and arranged for percutaneous insertion into a patient. Optionally, the catheter 202 may define at least one flush port, such as flush port 218. The flush port 218 may be defined in the hub 212. The hub 212 may be configured and arranged to couple to the control subsystem 204 of intravascular treatment system 200. In some instances, the elongated member 210 and the hub 212 are formed as a unitary body. In other instances, the elongated member 210 and the catheter hub 212 are formed separately and subsequently assembled together.

FIG. 2C is a perspective view of one embodiment of the distal end 216 of the elongated member 210 of the catheter 202. The elongated member 210 includes a sheath 220 with a longitudinal axis (e.g., a central longitudinal axis extending axially through the center of the sheath 220 and/or the catheter 202) and a lumen 222. An imaging core 224 is disposed in the lumen 222. The imaging core 224 includes an imaging device 226 coupled to a distal end of a driveshaft 228 that is rotatable either manually or using a computer-controlled drive mechanism. One or more transducers 230 may be mounted to the imaging device 226 and employed to transmit and receive acoustic signals. The sheath 220 may be formed from any flexible, biocompatible material suitable for insertion into a patient. Examples of suitable materials include, for example, polyethylene, polyurethane, plastic, spiral-cut stainless steel, nitinol hypotube, and the like or combinations thereof.

In some instances, for example as shown in these figures, an array of transducers 230 are mounted to the imaging device 226. Alternatively, a single transducer may be employed. Any suitable number of transducers 230 can be used. For example, there can be two, three, four, five, six, seven, eight, nine, ten, twelve, fifteen, sixteen, twenty, twenty-five, fifty, one hundred, five hundred, one thousand, or more transducers. As will be recognized, other numbers of transducers may also be used. When a plurality of transducers 230 are employed, the transducers 230 can be configured into any suitable arrangement including, for example, an annular arrangement, a rectangular arrangement, or the like.

The one or more transducers 230 may be formed from materials capable of transforming applied electrical pulses to pressure distortions on the surface of the one or more transducers 230, and vice versa. Examples of suitable materials include piezoelectric ceramic materials, piezocomposite materials, piezoelectric plastics, barium titanates, lead zirconate titanates, lead metaniobates, polyvinylidene fluorides, and the like. Other transducer technologies include composite materials, single-crystal composites, and semiconductor devices (e.g., capacitive micromachined ultrasound transducers ("cMUT"), piezoelectric micromachined ultrasound transducers ("pMUT"), or the like).

The pressure distortions on the surface of the one or more transducers 230 form acoustic pulses of a frequency based on the resonant frequencies of the one or more transducers 230. The resonant frequencies of the one or more transducers 230 may be affected by the size, shape, and material used to form the one or more transducers 230. The one or more transducers 230 may be formed in any shape suitable for positioning within the catheter 202 and for propagating acoustic pulses of a desired frequency in one or more selected directions. For example, transducers may be disc-shaped, block-shaped, rectangular-shaped, oval-shaped, and the like. The one or more transducers may be formed in the desired shape by any process including, for example, dicing, dice and fill, machining, microfabrication, and the like.

As an example, each of the one or more transducers 230 may include a layer of piezoelectric material sandwiched between a matching layer and a conductive backing material formed from an acoustically absorbent material (e.g., an epoxy substrate with tungsten particles). During operation, the piezoelectric layer may be electrically excited to cause the emission of acoustic pulses.

The one or more transducers 230 can be used to form a radial cross-sectional image of a surrounding space. Thus, for example, when the one or more transducers 230 are disposed in the catheter 202 and inserted into a blood vessel of a patient, the one more transducers 230 may be used to form an image of the walls of the blood vessel and tissue surrounding the blood vessel.

The imaging core 224 is rotated about the longitudinal axis of the catheter 202. As the imaging core 224 rotates, the one or more transducers 230 emit acoustic signals in different radial directions (e.g., along different radial scan lines). For example, the one or more transducers 230 can emit acoustic signals at regular (or irregular) increments, such as 256 radial scan lines per revolution, or the like. It will be understood that other numbers of radial scan lines can be emitted per revolution, instead.

When an emitted acoustic pulse with sufficient energy encounters one or more medium boundaries, such as one or more tissue boundaries, a portion of the emitted acoustic pulse is reflected back to the emitting transducer as an echo pulse. Each echo pulse that reaches a transducer with sufficient energy to be detected is transformed to an electrical signal in the receiving transducer. The one or more transformed electrical signals are transmitted to the processor 106 of the computing device 104 where it is processed to form vessel images 120 and subsequently generate predicted vessel expansion 124 and graphical information element 126 to be displayed on display 112. In some instances, the rotation of the imaging core 224 is driven by the drive unit 206, which can be disposed in control subsystem 204. In alternate embodiments, the one or more transducers 230 are fixed in place and do not rotate. In which case, the driveshaft 228 may, instead, rotate a mirror that reflects acoustic signals to and from the fixed one or more transducers 230.

When the one or more transducers 230 are rotated about the longitudinal axis of the catheter 202 emitting acoustic pulses, a plurality of images can be formed that collectively form a radial cross-sectional image (e.g., a tomographic image) of a portion of the region surrounding the one or more transducers 230, such as the walls of a blood vessel of interest and tissue surrounding the blood vessel. The radial cross-sectional image can form the basis of vessel images 120, and can optionally be displayed on display 112. The at least one of the imaging core 224 can be either manually rotated or rotated using a computer-controlled mechanism.

The imaging core 224 may also move longitudinally along the blood vessel within which the catheter 202 is inserted so that a plurality of cross-sectional images may be formed along a longitudinal length of the blood vessel. During an imaging procedure the one or more transducers 230 may be retracted (e.g., pulled back) along the longitudinal length of the catheter 202. The catheter 202 can include at least one telescoping section that can be retracted during pullback of the one or more transducers 230. In some instances, the drive unit 206 drives the pullback of the imaging core 224 within the catheter 202. The drive unit 206 pullback distance of the imaging core can be any suitable distance including, for example, at least 5 cm, 10 cm, 15 cm, 20 cm, 25 cm, or more. The entire catheter 202 can be retracted during an imaging procedure either with or without the imaging core 224 moving longitudinally independently of the catheter 202.

A stepper motor may, optionally, be used to pull back the imaging core 224. The stepper motor can pull back the imaging core 224 a short distance and stop long enough for the one or more transducers 230 to capture an image or series of images before pulling back the imaging core 224 another short distance and again capturing another image or series of images, and so on.

The quality of an image produced at different depths from the one or more transducers 230 may be affected by one or more factors including, for example, bandwidth, transducer focus, beam pattern, as well as the frequency of the acoustic pulse. The frequency of the acoustic pulse output from the one or more transducers 230 may also affect the penetration depth of the acoustic pulse output from the one or more transducers 230. In general, as the frequency of an acoustic pulse is lowered, the depth of the penetration of the acoustic pulse within patient tissue increases. In some instances, the intravascular treatment system 200 operates within a frequency range of 5 MHz to 200 MHz.

One or more conductors 232 can electrically couple the transducers 230 to the control subsystem 204. In which case, the one or more conductors 232 may extend along a longitudinal length of the rotatable driveshaft 228.

The catheter 202 with one or more transducers 230 mounted to the distal end 216 of the imaging core 224 may be inserted percutaneously into a patient via an accessible blood vessel, such as the femoral artery, femoral vein, or jugular vein, at a site remote from the selected portion of the selected region, such as a blood vessel, to be imaged. The catheter 202 may then be advanced through the blood vessels of the patient to the selected imaging site, such as a portion of a selected blood vessel.

An image or image frame ("frame") can be generated each time one or more acoustic signals are output to surrounding tissue and one or more corresponding echo signals are received by the imaging device 226 and transmitted to the processor 106 of the computing device 104. Alternatively, an image or image frame can be a composite of scan lines from a full or partial rotation of the imaging core or device. A plurality (e.g., a sequence) of frames may be acquired over time during any type of movement of the imaging device 226. For example, the frames can be acquired during rotation and pullback of the imaging device 226 along the target imaging location. It will be understood that frames may be acquired both with or without rotation and with or without pullback of the imaging device 226. Moreover, it will be understood that frames may be acquired using other types of movement procedures in addition to, or in lieu of, at least one of rotation or pullback of the imaging device 226.

In some instances, when pullback is performed, the pullback may be at a constant rate, thus providing a tool for potential applications able to compute longitudinal vessel/plaque measurements. In some instances, the imaging device 226 is pulled back at a constant rate of between 0.3 and 15 mm/s. In some examples, the imaging device 226 is pulled back at a constant rate of about 0.3-0.9 mm/s or about 0.5-0.8 mm/s. In some instances, the imaging device 226 is pulled back at a constant rate of at least 0.3 mm/s. In some instances, the imaging device 226 is pulled back at a constant rate of at least 0.4 mm/s. In some instances, the imaging device 226 is pulled back at a constant rate of at least 0.5 mm/s. In some instances, the imaging device 226 is pulled back at a constant rate of at least 0.6 mm/s. In some instances, the imaging device 226 is pulled back at a constant rate of at least 0.7 mm/s. In some instances, the imaging device 226 is pulled back at a constant rate of at least 0.8 mm/s.

In some instances, the one or more acoustic signals are output to surrounding tissue at constant intervals of time. In some instances, the one or more corresponding echo signals are received by the imaging device 226 and transmitted to the processor 106 of the computing device 104 at constant intervals of time. In some instances, the resulting frames are generated at constant intervals of time.

Figure 3:
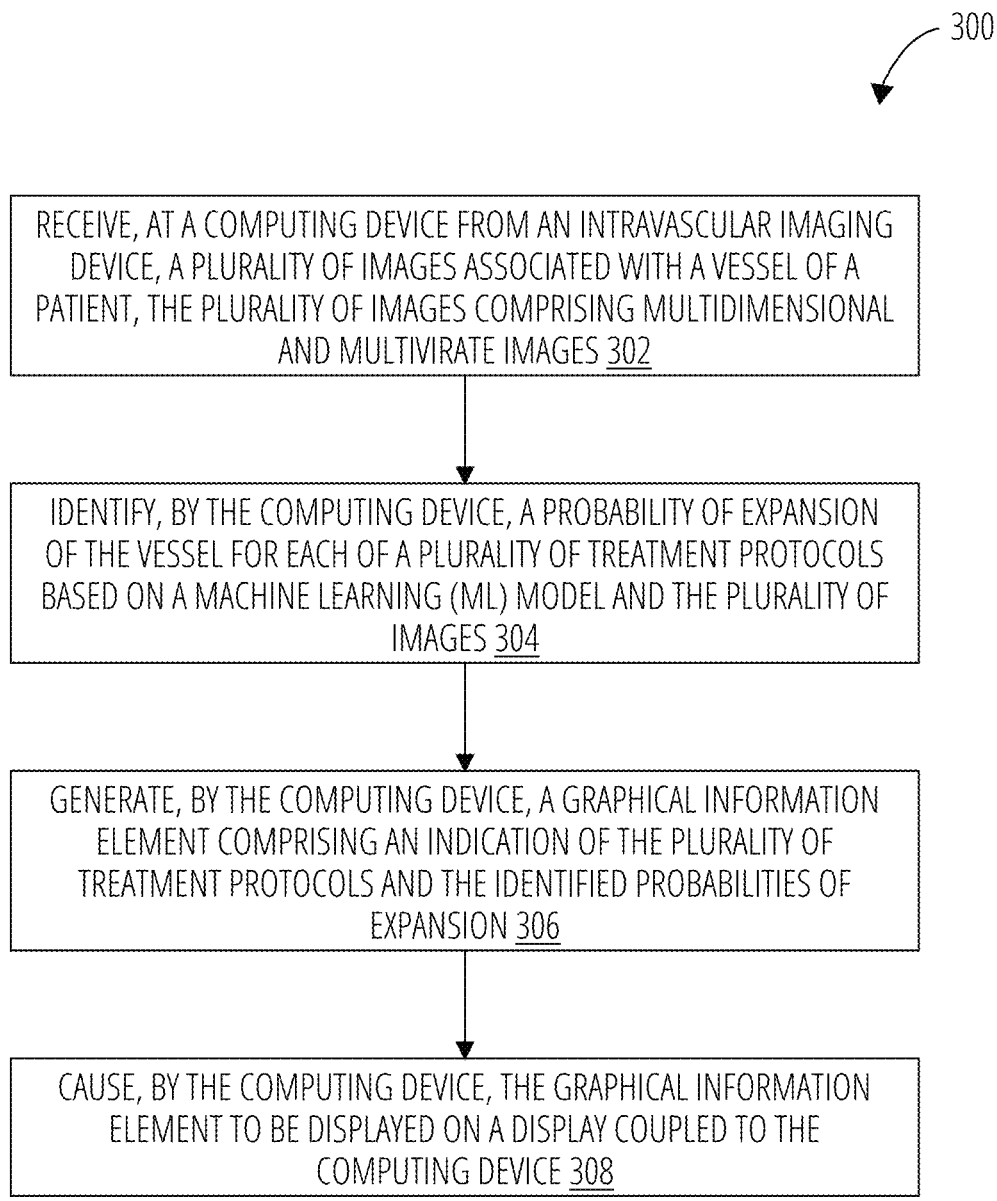
FIG. 3 illustrates a routine 300 for predicting vessel compliance in accordance with an embodiment.

FIG. 3 illustrates routine 300 according to some embodiments of the present disclosure. Routine 300 can be implemented by intravascular treatment system 100 or another computing device as outlined herein to provide graphical indications of probabilities of vessel expansion at the point-of-care. As described above, providing such probabilities at the point-of-care is significant as the physician cannot process the assessments and images generated at the point-of-care. Further, owing to the time constraints of such procedures and the risks to the patient inherent in longer treatments or bifurcated treatments, the present disclosure is a significant advantage over conventional methods where a physician determined a treatment protocol from assessment data and 2D images alone.

Routine 300 can begin at block 302. At block 302, computing device 104 of intravascular treatment system 100 receives vessel images 120 from intravascular imager 102 where vessel images 120 include multidimensional and multivariate images. For example, processor 106 can execute instructions 116 to receive data including indications of a vessel where such data is image data, voxel data, vector data and corresponds to a multidimensional and multivariate view of the vessel. As a specific example, vessel images 120 can include a series of 3D images captured by a IVUS imager. Further, at block 302, processor 106 can execute instructions 116 to receive (e.g., from I/O device 110, or the like) indications of patient information 122 (e.g., demographic data, health data, medical data, etc.).

Continuing to block 304 of routine 300, computing device 104 can identify a probability of expansion of the vessel associated with the vessel images 120 for each of a plurality of treatment protocols based on a machine learning (ML) model and the plurality of images. For example, processor 106 can execute instructions 116 and/or inference model 118 to generate predicted vessel expansion 124 from vessel images 120. As another example, processor 106 can execute instructions 116 and/or inference model 118 to generate predicted vessel expansion 124 from vessel images 120 and patient information 122. It is noted, as outlined above, predicted vessel expansion 124 includes predicted vessel expansion of the vessel associated with vessel images 120 for multiple treatment protocols.

Continuing to block 306 of routine 300, computing device 104 can generate a graphical information element comprising an indication of the plurality of treatment protocols and the identified probabilities of expansion of the vessel. For example, processor 106 can execute instructions 116 to generate graphical information element 126 comprising indications of predicted vessel expansion 124. Examples of graphical information element 126 are given below. However, in general, graphical information element 126 can be a table, a graph, or another graphical representation of predicted vessel expansion 124.

Continuing to block 308 of routine 300, computing device 104 can causes the graphical information element to be displayed on a display coupled to the computing device. For example, processor 106 can execute instructions 116 to cause graphical information element 126 to be displayed by display 112.

Figures 4A, 4B:
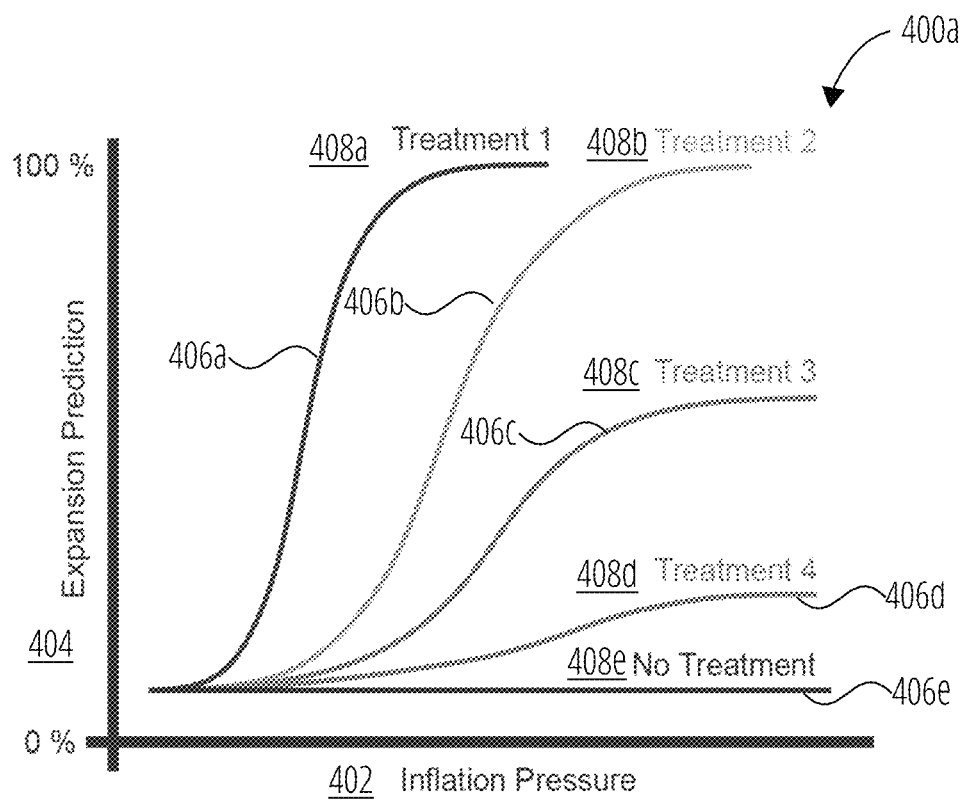
FIG. 4A illustrates a graphical information element in accordance with an embodiment.
FIG. 4B illustrates another graphical information element in accordance with an embodiment.

FIG. 4A illustrates a graphical information element 400a according to some embodiments of the present disclosure. With some embodiments, graphical information element 126 can be a graph showing a number of plots. As depicted, the graphical information element 400a shows plots 406a, 406b, 406c, 406d and 406e plotted on an x axis 402 and a y axis 404, where the x axis 402 defines a characteristic (or treatment parameter) of a treatment protocol (e.g., balloon pressure, or the like) and the y axis 404 defines the percent of vessel expansion from 0% expanded to 100% expanded.

Further, graphical information element 400a can include label 408a, 408b, 408c, 408d and 408e corresponding to a respective plot (e.g., label 408a corresponds to plot 406a, etc.). In some examples, the labels can comprise an indication of the treatment protocol (e.g., POBA, atherectomy, cutting and/or scoring balloons, high pressure balloons, intravascular lithoplasty, etc.). Further, in some embodiments, graphical information element 400a can include a plot showing a baseline vessel expansion, or said differently, a plot showing the vessel expansion without treatment.

Graphical information element 400a can be generated to provide a physician with a quick and readily transparent indication of the likelihood of success of a number of treatment options compared with no treatment. This is advantageous over current methods and workflows where no indication of success or vessel expansion is available to the physician a priori.

FIG. 4B illustrates a graphical information element 400b according to some embodiments of the present disclosure. With some embodiments, graphical information element 126 can be a table showing potential treatment protocols and associated predicted vessel expansion. For example, graphical information element 400b shows a table with a column for the treatment protocol and another column for the predicted vessel expansion while the rows show the plurality of treatment protocols and the associated, or respective, predicted vessel expansion. In some examples, as depicted, the predicted vessel expansion can be a percent. In other examples, the predicted vessel expansion can be a number within a range (e.g., a scaler between 1 and 5), a "likelihood" of expansion (e.g., low, medium, high, or the like).

Figure 5A:
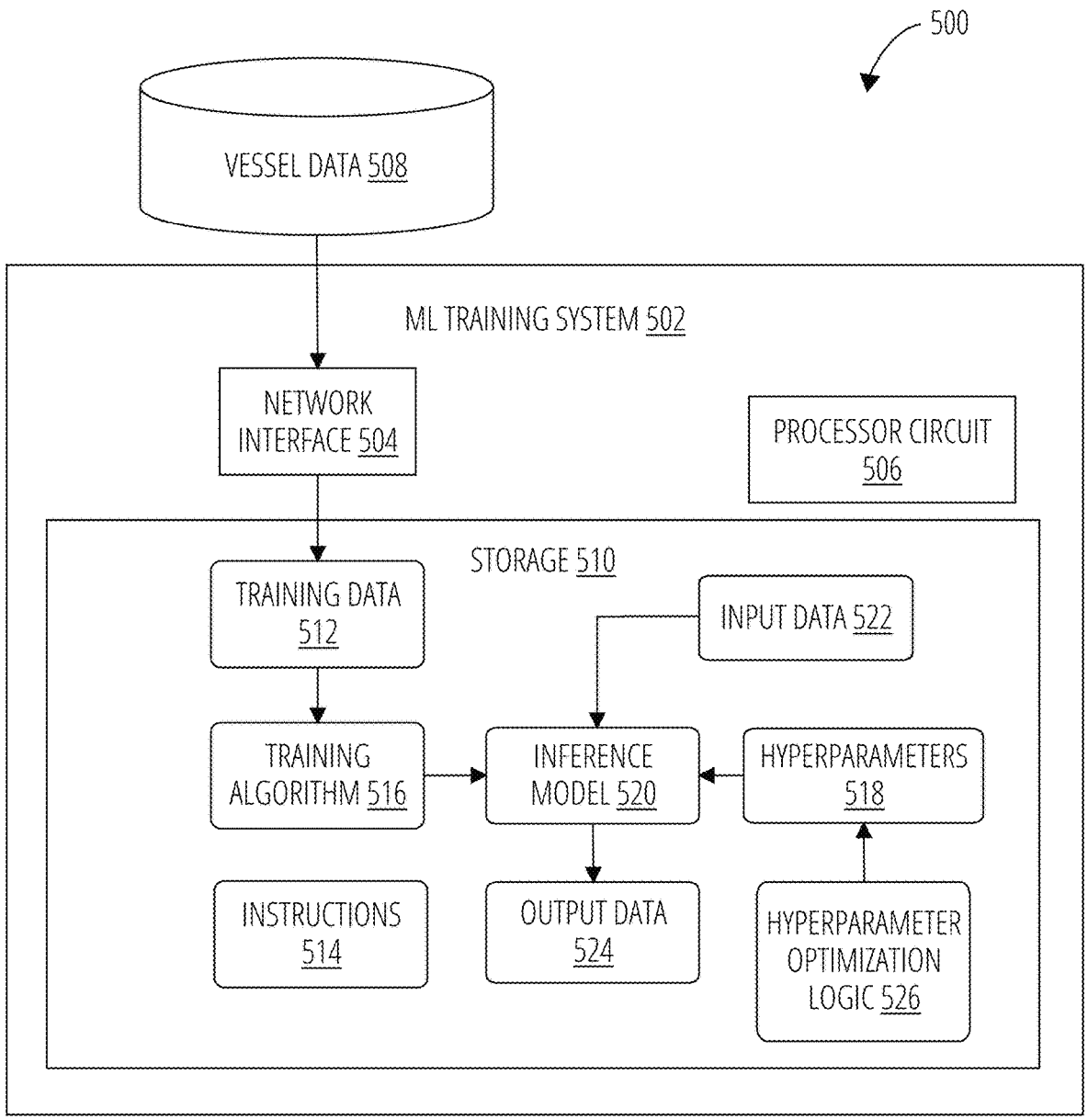
FIG. 5A illustrates a machine learning (ML) system in accordance with an embodiment.

As described above, computing device 104, and particularly processor 106 executing instructions 116 and/or inference model 118 is used to generate predicted vessel expansion 124 from vessel images 120. In particular inference model 118 provides predicted vessel expansion 124 comprising indications of probability of vessel expansion for a number of treatment protocols from vessel images 120, which are multidimensional and multivariate images of a vessel of a patient. Accordingly, a system to train inference model 118 as well as routines to train inference model 118 and further routines to generate training data are provided herein. To that end, FIG. 5A depicts an ML environment 500 suitable for use with exemplary embodiments of this disclosure. The ML environment 500 may include an ML training system 502, such as a computing device that applies an ML algorithm to learn relationships between the above-noted dimensions and variables of the images and vessel compliance or expansion.

In some examples, vessel data 508 may be collocated with the ML training system 502 (e.g., stored in a storage 510 of the ML training system 502), may be remote from the ML training system 502 and accessed via a network interface 504, or may be a combination of local and remote data.

The ML training system 502 may make use of a database of vessel data 508. With some embodiments described herein, vessel data 508 can correspond to simulated results of vessel expansion. In other embodiments, vessel data 508 can correspond to actual results of vessel expansion. These examples are described in greater detail below. However, in general vessel data 508 includes data comprising indications of multidimensional and multivariate images of a vessel, which will often comprise a lesion (e.g., a calcified lesion, or the like) and results (e.g., vessel compliance and/or vessel patency results) from either simulated or real treatments for several treatment protocols. It is noted, that where the results are simulated each vessel image (or set of images) can comprise an associated result for a number of treatment protocols. However, where the results are from actual treatment protocols, each vessel image (or set of vessel images) will naturally have one associated result.

Figure 5B:
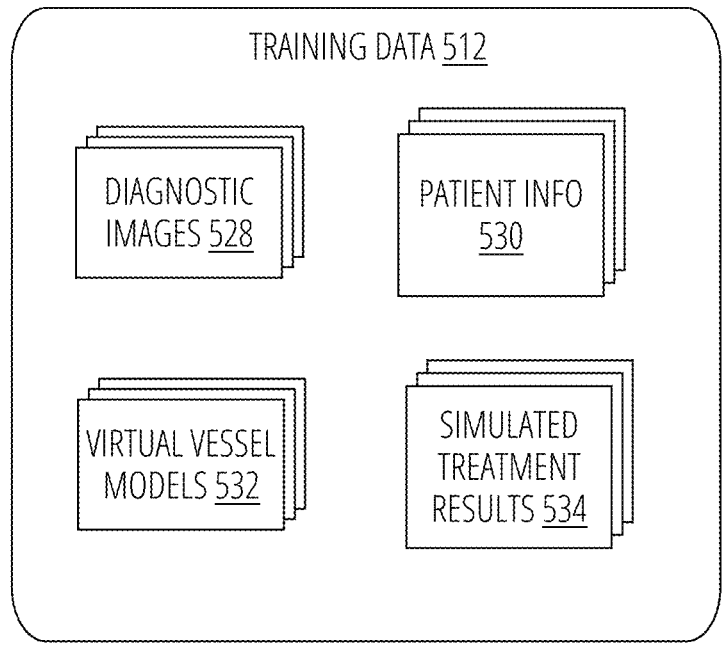
FIG. 5B illustrates training dataset in accordance with an embodiment.

For example, FIG. 5B illustrates training data 512 according to an embodiment. As depicted, training data 512 includes diagnostic images 528, patient information 530, virtual vessel models 532 and simulated treatment results 534. With some examples, diagnostic images 528 from patient images from various imaging modalities (e.g., OCT, OCE, IVUS, MRI, CT, etc.) can be gathered (e.g., from vessel data 508, or the like). Patient information 530 can additionally, be gathered (e.g., from vessel data 508, or the like). It is noted that with some embodiments, vessel data 508 can correspond to patient medical records. As such, the present disclosure contemplates gathering and/or receiving diagnostic images 528 and patient information 530 using various anonymization techniques to conceal or remove identifying information about particular patients.

Often, the training data 512 can include many "sub-sets" of data where each sub-set corresponds to a vessel of a patient. For example, diagnostic images 528 can include multiple sub-sets of diagnostic images 528 where each sub-set of diagnostic images 528 includes diagnostic images 528 for a vessel of a patient. As such, across all sub-sets of diagnostic images 528 in training data 512, multiple patients, or rather a vessel or multiple vessels from multiple patients is represented. This same concept applies to other portions (e.g., or images) in training data 512.

Virtual vessel models 532 can be generated (or created) from diagnostic images 528. For example, processor circuit 506 can execute instructions 514 to generate virtual vessel models 532 from diagnostic images 528. With some examples, processor circuit 506 can execute instructions 514 to generate virtual vessel models 532 using finite element analysis to map material properties of the vessel represented in the diagnostic images 528 to voxelized models (e.g., virtual vessel models 532).

Simulated treatment results 534 can be generated from virtual vessel models 532. For example, processor circuit 506 can execute instructions 514 to generate simulated treatment results 534 from virtual vessel models 532. With some examples, processor circuit 506 can execute instructions 514 to generate simulated treatment results 534 by simulating various treatment protocols (e.g., using finite element analysis of the voxelized models, or the like) on the virtual vessel models 532. In particular, processor circuit 506 can execute instructions 514 to identify vessel expansion and/or vessel patency resulting from performance of different treatment protocols (e.g., POBA, atherectomy, cutting and/or scoring balloons, high pressure balloons, intravascular lithoplasty, etc.) and stent placement. It is to be appreciated that the modeling and simulation techniques proposed herein are not possible at the point-of-care. That is, such modeling and simulation techniques often consume hundreds of hours of run time as well as many gigaflops of compute and memory resources. As such, use of such techniques as the point-of-care, or rather intra procedure is not possible.

Figure 5C:
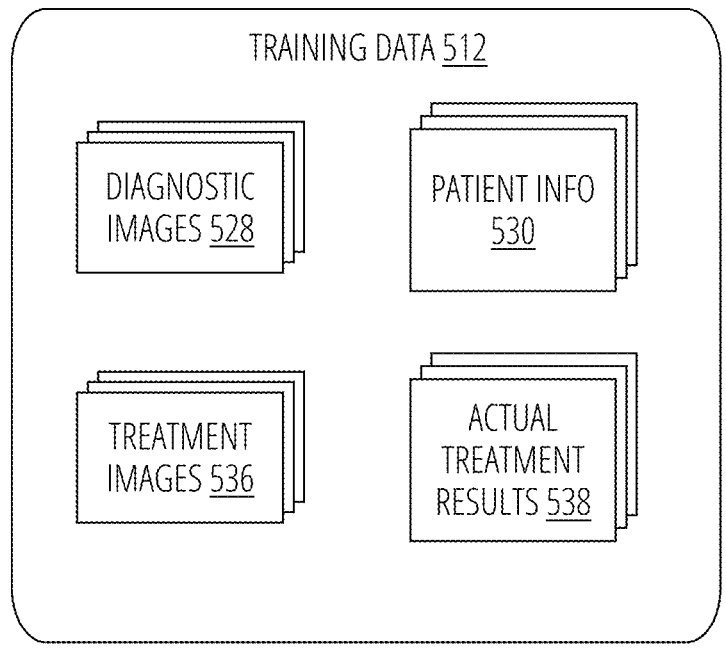
FIG. 5C illustrates another training dataset in accordance with another embodiment.

FIG. 5C illustrates another example of training data 512 in accordance with embodiments of the present disclosure. As depicted, training data 512 includes diagnostic images 528, patient information 530 as well as treatment images 536 and actual treatment results 538. As with the example depicted in FIG. 5B, diagnostic images 528 from patient images from various imaging modalities (e.g., OCT, OCE, IVUS, MRI, CT, etc.) can be gathered (e.g., from vessel data 508, or the like). Similarly, patient information 530 can additionally, be gathered (e.g., from vessel data 508, or the like).

With further embodiments, treatment images 536 associated with the diagnostic images 528 and patient information 530 can be gathered. Treatment images 536 can correspond to images of the vessels of the patients represented in diagnostic images 528 and patient information 530 during and/or post treatment (e.g., post stenting, or the like). Additionally, actual treatment results 538 (e.g., actual vessel expansion and/or actual post-treatment vessel patency) corresponding to the vessels of the patients represented in the diagnostic images 528 and treatment images 536.

As before, vessel data 508 can correspond to patient medical records. As such, the present disclosure contemplates gathering and/or receiving diagnostic images 528, patient information 530, treatment images 536, and actual treatment results 538 using various anonymization techniques to conceal or remove identifying information about particular patients.

As noted above, the ML training system 502 may include a storage 510, which may include a hard drive, solid state storage, and/or random access memory. The storage 510 may hold or store training data 512. The training data 512 may be applied to train the inference model 520. However, the present disclosure provides to train inference model 520, or ML model, to infer a probability of vessel expansion from a set of diagnostic images (e.g., diagnostic images 528) such that inference model 520 can be implemented at point-of-care to generate, or infer, predicted vessel expansion 124 from vessel images 120. As such, inference model 520 can be implemented to rapidly provide the physician with a recommended optimal treatment plan and/or rank potential treatments based on probability of success and/or vessel expansion.

Depending on the particular application, different types of inference models 520 may be suitable for use. For instance, in the depicted example, convoluted neural network (CNN) may be particularly well-suited to learning associations between diagnostic images and probability of vessel expansion and patency. However, any suitable training algorithm 516 may be used to train the inference model 520. Nonetheless, the example depicted in these figures may be particularly well-suited to a supervised training algorithm or reinforcement learning. For a supervised training algorithm, the ML training system 502 may apply portions of the training data 512 as input data, to which vessel expansion may be mapped to learn associations between the inputs and the vessel expansion.

For example, processor circuit 506 can execute instructions 514 to structure diagnostic images 528 and patient information 530 as input data 522. Further, processor circuit 506 can execute instructions 514 to map input data 522 to simulated treatment results 534 and/or actual treatment results 538. In a reinforcement learning scenario, the output data 524 is generated by the inference model 520 using hyperparameters 518 (e.g., weights, connections, convolutions, etc.) applied to input data 522. The training algorithm 516 may be applied using the processor circuit 506 to optimize the hyperparameters 518 such that the output data 524 matches the expected or mapped output data. Hyperparameter optimization logic 526, which may include any known hyperparameter optimization techniques as appropriate to the inference model 520 can be used to repeatedly update hyperparameters 518 such that the output data 524 converges on the expected output. With some embodiments, the inference model 520 may be re-trained over time, in order to account for new images in training data 512.

In some embodiments, some of the training data 512 may be used to initially train the inference model 520, and some may be held back as a validation subset. The portion of the training data 512 not including the validation subset may be used to train the inference model 520, whereas the validation subset may be held back and used to test the trained inference model 520 to verify that the inference model 520 is able to generalize its predictions to unseen data.

Once the inference model 520 is trained, it may be applied at point-of-care to infer vessel expansion from diagnostic images. For example, inference model 520 can be deployed as inference model 118 of intravascular treatment system 100 of FIG. 1. In such an example, processor 106 can execute instructions 116 to mirror the way that the training data 512 was provided to the inference model 520 but with vessel images 120.

The above description pertains to a particular kind of ML training system 502, which applies supervised learning techniques given available training data with input/result pairs. However, the present disclosure is not limited to use with a specific ML paradigm, and other types of artificial intelligence and/or ML techniques may be used.

Figure 6:
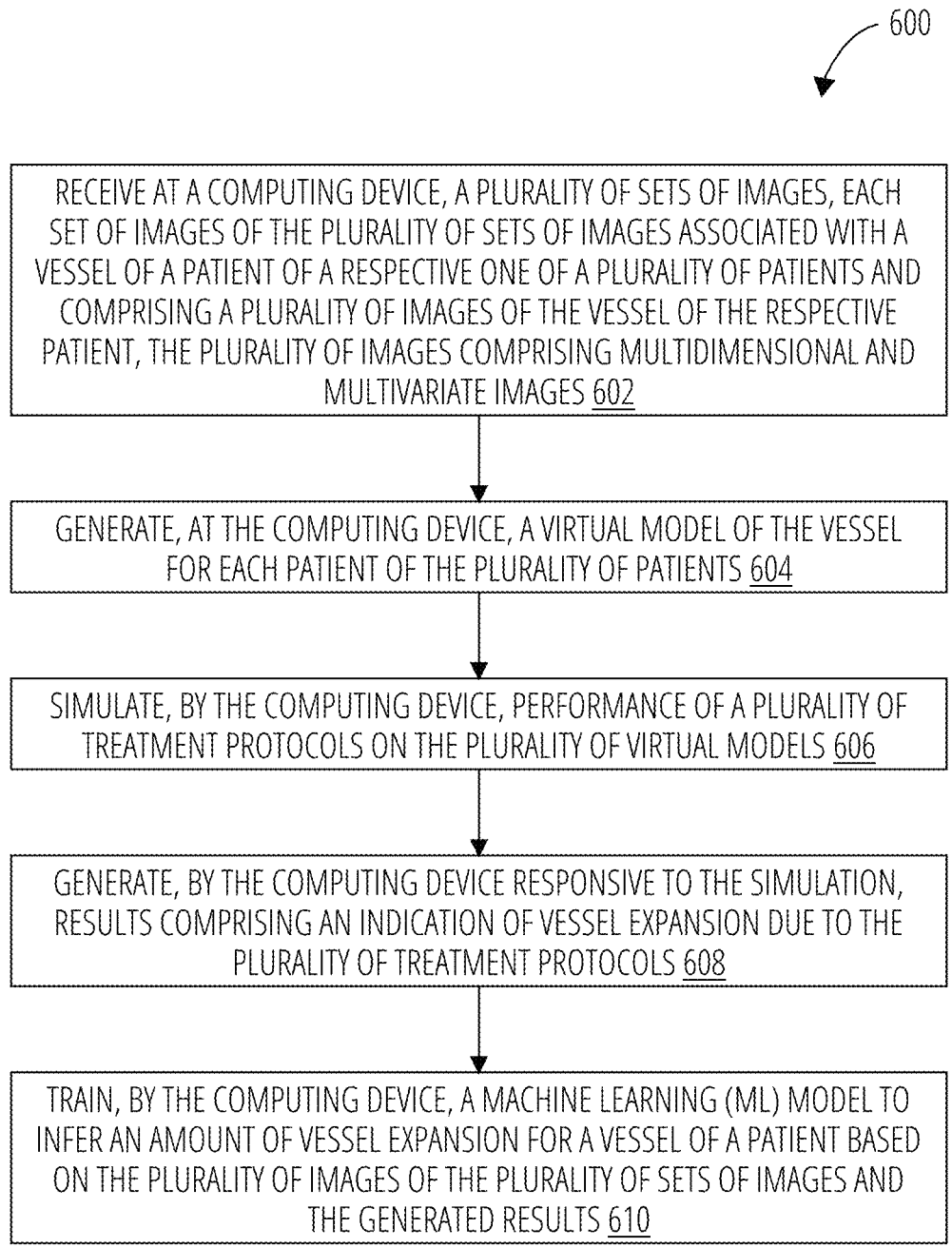
FIG. 6 illustrates a routine to train an inference model in accordance with an embodiment.

FIG. 6 illustrates a routine 600 according to some embodiments of the present disclosure. Routine 600 can be implemented by ML environment 500 or another computing device as outlined herein to train an inference model (e.g., inference model 118) to infer probability of vessel expansion based on diagnostic images at the point-of-care. As described above, providing such probabilities at the point-of-care is significant as the physician cannot process the assessments and images generated at the point-of-care. Further, owing to the time constraints of such procedures and the risks to the patient inherent in longer treatments or bifurcated treatments, the present disclosure is a significant advantage over conventional methods where a physician determined a treatment protocol from assessment data and 2D images alone.

Routine 600 can begin at block 602. At block 602, routine 600 receives at a computing device a plurality of sets of images, each set of images of the plurality of sets of images associated with a vessel of a patient of a respective one of a plurality of patients and comprising a plurality of images of the vessel of the respective patient, the plurality of images comprising multidimensional and multivariate images. For example, processor circuit 506 can execute instructions 514 to receive (e.g., from vessel data 508, or the like) diagnostic images 528 where the diagnostic images 528 comprise multidimensional and multivariate images associated with a vessel of a plurality of patients. In some examples, at block 602, processor circuit 506 can execute instructions 514 to receive patient information 530 from vessel data 508.

Continuing to block 604 of routine 600, the computing device can generate a virtual model of the vessel for each patient of the plurality of patients. For example, processor circuit 506 can execute instructions 514 to generate virtual vessel models 532 from diagnostic images 528. For example, processor circuit 506 can execute instructions 514 to generate virtual vessel models 532 from diagnostic images 528 by application of finite element analysis.

Continuing to block 606 of routine 600, the computing device can simulate performance of plurality of treatment protocols on the virtual models. For example, processor circuit 506 can execute instructions 514 to simulate performance of treatment protocols on virtual vessel models 532. Continuing to block 608 of routine 600, the computing device can generate treatment results responsive to the simulation at block 606. For example, processor circuit 506 can execute instructions 514 to generate simulated treatment results 534 from simulation of the treatment protocols on virtual vessel models 532.

Continuing to block 610 of routine 600, the computing device can train an inference model to infer an amount of vessel expansion for a vessel of a patient based on the plurality of images of the plurality of sets of images and the generated results. For example, processor circuit 506 can execute instructions 514 to train inference model 520 based on training data 512.

Figure 7:
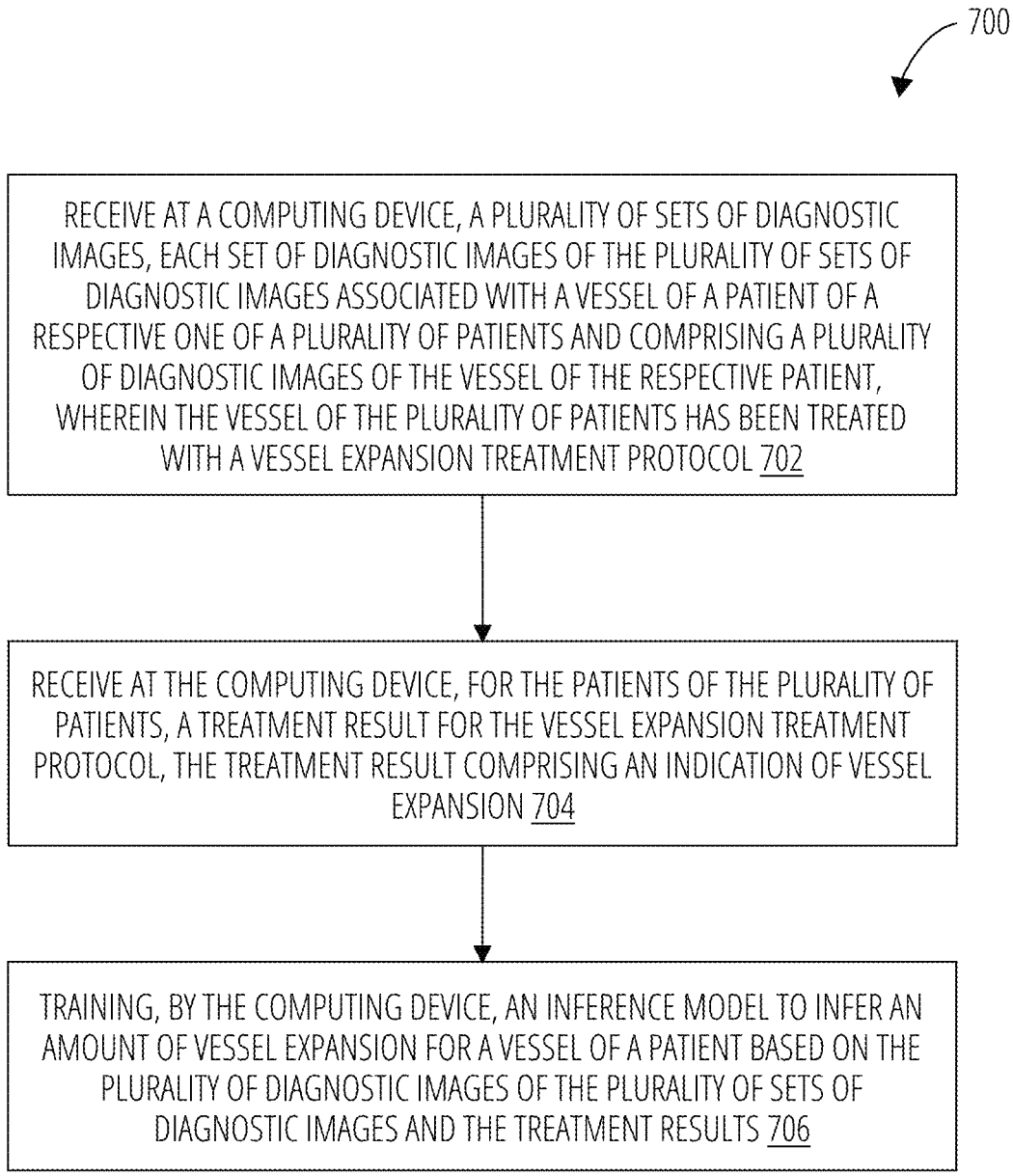
FIG. 7 illustrates another routine to train an inference model in accordance with another embodiment.

FIG. 7 illustrates a routine 700 according to some embodiments of the present disclosure. Routine 700 can be implemented by ML environment 500 or another computing device as outlined herein to train an inference model (e.g., inference model 118) to infer probability of vessel expansion based on diagnostic images at the point-of-care. Routine 700 can begin at block 702. At block 702, routine 700 receives at a computing device a plurality of sets of diagnostic images, each set of diagnostic images of the plurality of sets of diagnostic images associated with a vessel of a patient of a respective one of a plurality of patients and comprising a plurality of diagnostic images of the vessel of the respective patient, wherein the vessel of the plurality of patients has been treated with a vessel expansion treatment protocol. For example, processor circuit 506 can execute instructions 514 to receive (e.g., from vessel data 508, or the like) diagnostic images 528 where the diagnostic images 528 are associated with a vessel of a plurality of patients. In some examples, at block 602, processor circuit 506 can execute instructions 514 to further receive treatment images 536 and patient information 530 from vessel data 508.

Continuing to block 704 of routine 700, the computing device receives a treatment result for the vessel expansion treatment protocol for the patients of the plurality of patients, the treatment result comprising an indication of vessel expansion. For example, processor circuit 506 can execute instructions 514 to receive (e.g., from vessel data 508, or the like) actual treatment results 538 associated with a treatment protocol performed on the vessel of the patients associated with the diagnostic images 528 received at block 702, where the actual treatment results 538 indicate a quantity of vessel expansion resulting from the treatment. In some embodiments, where treatment images 536 are also received at block 702, the treatment images 536 can be images that were captured during performance of the treatment protocols.

Continuing to block 706 of routine 700, the computing device can train an inference model to infer an amount of vessel expansion for a vessel of a patient based on the diagnostic images 528 and the actual treatment results 538 or the diagnostic images 528, treatment images 536, and actual treatment results 538. For example, processor circuit 506 can execute instructions 514 to train inference model 520 based on training data 512.

Figure 8:
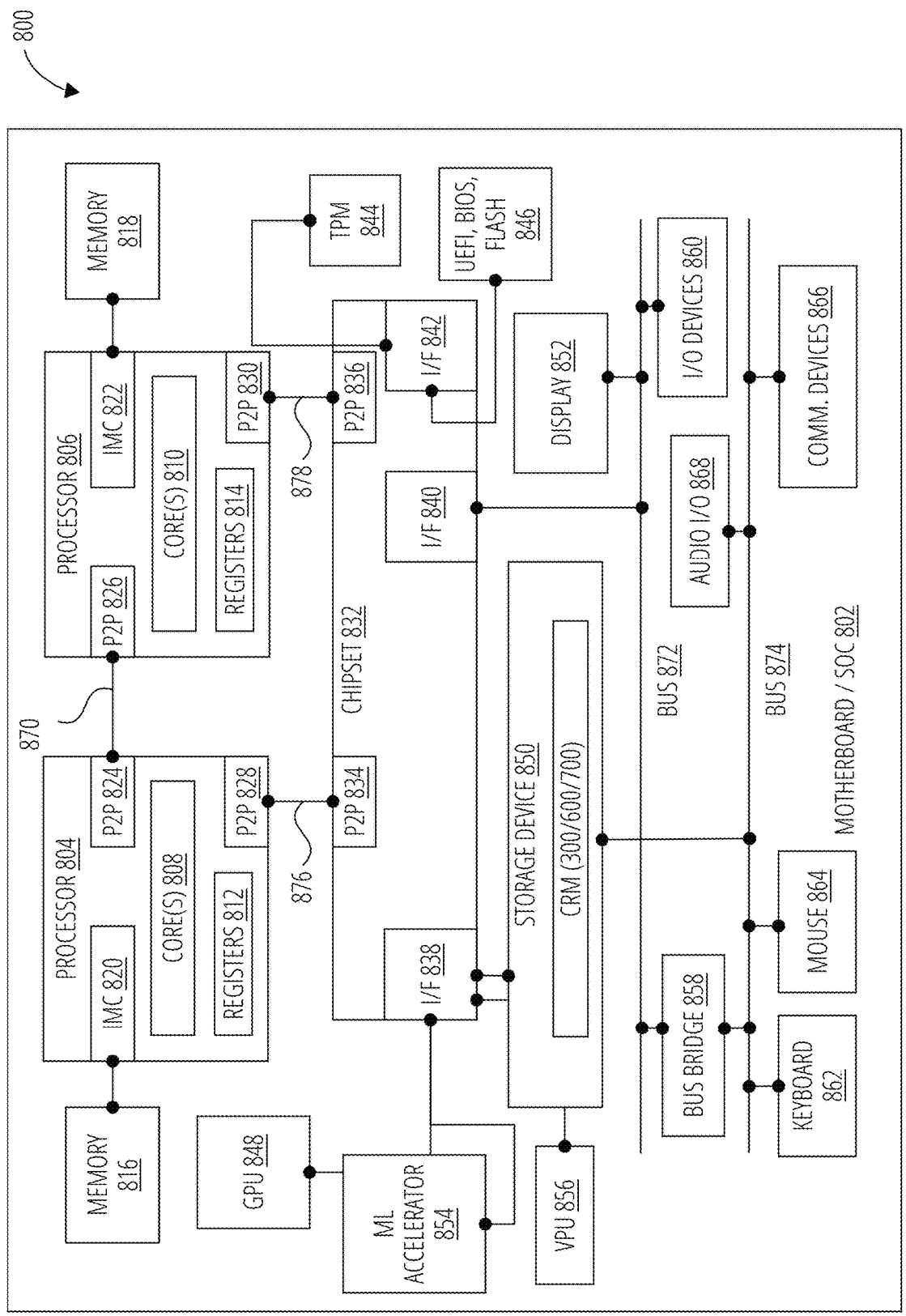
FIG. 8 illustrates a computing device in accordance with an embodiment.

FIG. 8 illustrates an embodiment of a system 800. System 800 is a computer system with multiple processor cores such as a distributed computing system, supercomputer, high-performance computing system, computing cluster, mainframe computer, mini-computer, client-server system, personal computer (PC), workstation, server, portable computer, laptop computer, tablet computer, handheld device such as a personal digital assistant (PDA), or other device for processing, displaying, or transmitting information. Similar embodiments may comprise, for example, entertainment devices such as a portable music player or a portable video player, a smart phone or other cellular phone, a telephone, a digital video camera, a digital still camera, an external storage device, or the like. Further embodiments implement larger scale server configurations. In other embodiments, the system 800 may have a single processor with one core or more than one processor. Note that the term "processor" refers to a processor with a single core or a processor package with multiple processor cores. In at least one embodiment, the computing system 800 is representative of the components of the computing device 104. More generally, the computing system 800 is configured to implement all logic, systems, logic flows, methods, apparatuses, and functionality described herein with reference to FIG. 1 through FIG. 7.

As used in this application, the terms "system" and "component" and "module" are intended to refer to a computer-related entity, either hardware, a combination of hardware and software, software, or software in execution, examples of which are provided by the exemplary system 800. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

As shown in this figure, system 800 comprises a motherboard or system-on-chip (SoC) 802 for mounting platform components. Motherboard or system-on-chip (SoC) 802 is a point-to-point (P2P) interconnect platform that includes a first processor 804 and a second processor 806 coupled via a point-to-point interconnect 870 such as an Ultra Path Interconnect (UPI). In other embodiments, the system 800 may be of another bus architecture, such as a multi-drop bus. Furthermore, each of processor 804 and processor 806 may be processor packages with multiple processor cores including core(s) 808 and core(s) 810, respectively as well as multiple registers, memories, or caches, such as, registers 812 and registers 814, respectively. While the system 800 is an example of a two-socket (2S) platform, other embodiments may include more than two sockets or one socket. For example, some embodiments may include a four-socket (4S) platform or an eight-socket (8S) platform. Each socket is a mount for a processor and may have a socket identifier. Note that the term platform refers to the motherboard with certain components mounted such as the processor 804 and chipset 832. Some platforms may include additional components and some platforms may include sockets to mount the processors and/or the chipset. Furthermore, some platforms may not have sockets (e.g. SoC, or the like).

The processor 804 and processor 806 can be any of various commercially available processors, including without limitation an Intel® Celeron®, Core®, Core (2) Duo®, Itanium®, Pentium®, Xeon®, and XScale® processors; AMD® Athlon®, Duron® and Opteron® processors; ARM® application, embedded and secure processors; IBM® and Motorola® DragonBall® and PowerPC® processors; IBM and Sony® Cell processors; and similar processors. Dual microprocessors, multi-core processors, and other multi processor architectures may also be employed as the processor 804 and/or processor 806. Additionally, the processor 804 need not be identical to processor 806.

Processor 804 includes an integrated memory controller (IMC) 820 and point-to-point (P2P) interface 824 and P2P interface 828. Similarly, the processor 806 includes an IMC 822 as well as P2P interface 826 and P2P interface 830. IMC 820 and IMC 822 couple the processors processor 804 and processor 806, respectively, to respective memories (e.g., memory 816 and memory 818). Memory 816 and memory 818 may be portions of the main memory (e.g., a dynamic random-access memory (DRAM)) for the platform such as double data rate type 3 (DDR3) or type 4 (DDR4) synchronous DRAM (SDRAM). In the present embodiment, the memories memory 816 and memory 818 locally attach to the respective processors (i.e., processor 804 and processor 806). In other embodiments, the main memory may couple with the processors via a bus and shared memory hub.

System 800 includes chipset 832 coupled to processor 804 and processor 806. Furthermore, chipset 832 can be coupled to storage device 850, for example, via an interface (I/F) 838. The I/F 838 may be, for example, a Peripheral Component Interconnect-enhanced (PCI-e). Storage device 850 can store instructions executable by circuitry of system 800 (e.g., processor 804, processor 806, GPU 848, ML accelerator 854, vision processing unit 856, or the like). For example, storage device 850 can store non-transitory computer-readable medium comprising instructions for routine 300, routine 600, routine 700, or combinations thereof, which instructions are executable by processing circuitry (e.g., processor 804, processor 806, etc.).

Processor 804 couples to a chipset 832 via P2P interface 828 and P2P 834 while processor 806 couples to a chipset 832 via P2P interface 830 and P2P 836. Direct media interface (DMI) 876 and DMI 878 may couple the P2P interface 828 and the P2P 834 and the P2P interface 830 and P2P 836, respectively. DMI 876 and DMI 878 may be a high-speed interconnect that facilitates, e.g., eight Giga Transfers per second (GT/s) such as DMI 3.0. In other embodiments, the processor 804 and processor 806 may interconnect via a bus.

The chipset 832 may comprise a controller hub such as a platform controller hub (PCH). The chipset 832 may include a system clock to perform clocking functions and include interfaces for an I/O bus such as a universal serial bus (USB), peripheral component interconnects (PCIs), serial peripheral interconnects (SPIs), integrated interconnects (I2Cs), and the like, to facilitate connection of peripheral devices on the platform. In other embodiments, the chipset 832 may comprise more than one controller hub such as a chipset with a memory controller hub, a graphics controller hub, and an input/output (I/O) controller hub.

In the depicted example, chipset 832 couples with a trusted platform module (TPM) 844 and UEFI, BIOS, FLASH circuitry 846 via I/F 842. The TPM 844 is a dedicated microcontroller designed to secure hardware by integrating cryptographic keys into devices. The UEFI, BIOS, FLASH circuitry 846 may provide pre-boot code.

Furthermore, chipset 832 includes the I/F 838 to couple chipset 832 with a high-performance graphics engine, such as, graphics processing circuitry or a graphics processing unit (GPU) 848. In other embodiments, the system 800 may include a flexible display interface (FDI) (not shown) between the processor 804 and/or the processor 806 and the chipset 832. The FDI interconnects a graphics processor core in one or more of processor 804 and/or processor 806 with the chipset 832.

Additionally, ML accelerator 854 and/or vision processing unit 856 can be coupled to chipset 832 via I/F 838. ML accelerator 854 can be circuitry arranged to execute ML related operations (e.g., training, inference, etc.) for ML models. Likewise, vision processing unit 856 can be circuitry arranged to execute vision processing specific or related operations. In particular, ML accelerator 854 and/or vision processing unit 856 can be arranged to execute mathematical operations and/or operands useful for machine learning, neural network processing, artificial intelligence, vision processing, etc.

Various I/O devices 860 and display 852 couple to the bus 872, along with a bus bridge 858 which couples the bus 872 to a second bus 874 and an I/F 840 that connects the bus 872 with the chipset 832. In one embodiment, the second bus 874 may be a low pin count (LPC) bus. Various devices may couple to the second bus 874 including, for example, a keyboard 862, a mouse 864 and communication devices 866.

Furthermore, an audio I/O 868 may couple to second bus 874. Many of the I/O devices 860 and communication devices 866 may reside on the motherboard or system-on-chip (SoC) 802 while the keyboard 862 and the mouse 864 may be add-on peripherals. In other embodiments, some or all the I/O devices 860 and communication devices 866 are add-on peripherals and do not reside on the motherboard or system-on-chip (SoC) 802.

Knowing when and how to treat, correlated to patient outcomes (vessel compliance), provides the best possible patient outcomes (vessel patency) while reducing the uncertainty in physician guided treatment strategies, simultaneously establishing a model of value-based care in the treatment algorithm.

By using genuine models of anatomy more accurate surgical plans may be developed than through statistical modeling.

What is claimed is:

1. A computing apparatus, comprising:
a processor; and
a memory storing instructions that, when executed by the processor, configures the apparatus to:
receive, from an intravascular imaging device, a plurality of images associated with a vessel of a patient, the plurality of images comprising multidimensional and multivariate images;
identify a probability of expansion of the vessel for each of a plurality of treatment protocols based on an inference model and the plurality of images;
generate a graphical information element comprising an indication of the plurality of treatment protocols and the identified probabilities of expansion; and
cause the graphical information element to be displayed on a display coupled to the computing device.

2. The computing apparatus of claim 1, the instructions, when executed by the processor cause the apparatus to:
provide the plurality of images as inputs to the inference model; and
execute the inference model to generate the probability of expansion of the vessel for each of the plurality of treatment protocols.

3. The computing apparatus of claim 1, wherein the plurality of treatment protocols comprise a first treatment protocol and a second treatment protocol and wherein the inference model comprises a first inference model, the instructions, when executed by the processor cause the apparatus to:
provide the plurality of images as inputs to the first inference model;
execute the first inference model to generate the probability of expansion of the vessel for the first treatment protocol;
provide the plurality of images as inputs to a second inference model; and
execute the second inference model to generate the probability of expansion of the vessel for the second treatment protocol.

4. The computing apparatus of claim 1, wherein the inference model is a convoluted neural network (CNN).

5. The computing apparatus of claim 4, wherein the CNN is trained with a training set comprising a plurality of sub-sets of training images, each of the sub-sets of training images comprising multidimensional and multivariate images of a vessel of a plurality of vessels, wherein the training images of each sub-set are associated with a probability of vessel expansion for each of the plurality of treatment protocols based on simulated treatment outcomes of the plurality of vessels.

6. The computing apparatus of claim 4, wherein the CNN is trained with a training set comprising a plurality of sub-sets of training images, each of the sub-sets of training images comprising multidimensional and multivariate images of a vessel of a treated patient, wherein the training images of each sub-set are associated with an expansion of the vessel of the treated patient, and a treatment protocol applied to the vessel of the treated patient.

7. The computing apparatus of claim 1, the graphical information element comprising a table comprising an indication of each of the treatment protocols and the identified probability of expansion.

8. The computing apparatus of claim 1, the instructions, when executed by the processor cause the apparatus to identify the probability of expansion relative to a treatment parameter.

9. The computing apparatus of claim 8, the graphical information element comprising a graph with a plurality of plots, wherein each plot of the plurality of plots is associated with a treatment protocol of the plurality of treatment protocols and indicates the identified probability of expansion relative to the treatment parameter.

10. The computing apparatus of claim 9, wherein the treatment parameter is balloon pressure.

11. The computing apparatus of claim 1, wherein the intravascular imaging device is an intravascular ultrasound (IVUS) device, an optical coherence tomography (OCT) device, an optical coherence elastography (OCE) device, or a spectroscopy device.

12. The computing apparatus of claim 1, wherein the vessel of the patient comprises a lesion.

13. The computing apparatus of claim 1, wherein the vessel of the patient comprises a calcified lesion.

14. The computing apparatus of claim 13, wherein the plurality of images comprise indications of the calcium or spectrum of calcification of atherosclerotic plaque.

15. A method, comprising:
receiving at a computing device, a plurality of sets of images, each set of images of the plurality of sets of images associated with a vessel of a patient of a respective one of a plurality of patients and comprising a plurality of images of the vessel of the respective patient, the plurality of images comprising multidimensional and multivariate images;
generating, at the computing device, a virtual model of the vessel for each patient of the plurality of patients;

simulating, by the computing device, performance of a plurality of treatment protocols on the plurality of virtual models;

generating, by the computing device responsive to the simulation, results comprising an indication of vessel expansion due to the plurality of treatment protocols; and training, by the computing device, an inference model to infer an amount of vessel expansion for a vessel of a patient based on the plurality of images of the plurality of sets of images and the generated results.

16. A non-transitory computer-readable storage medium, the computer-readable storage medium including instructions that when executed by a computer, cause the computer to:

receive, at a computing device from an intravascular imaging device, a plurality of images associated with a vessel of a patient, the plurality of images comprising multidimensional and multivariate images;

identify, by the computing device, a probability of expansion of the vessel for each of a plurality of treatment protocols based on an inference model and the plurality of images;

generate, by the computing device, a graphical information element comprising an indication of the plurality of treatment protocols and the identified probabilities of expansion; and cause, by the computing device, the graphical information element to be displayed on a display coupled to the computing device.

17. The computer-readable storage medium of claim 16, comprising instructions that when executed by a computer, further cause the computer to:

provide the plurality of images as inputs to the inference model; and execute the inference model to generate the probability of expansion of the vessel for each of the plurality of treatment protocols.

18. The computer-readable storage medium of claim 16, wherein the plurality of treatment protocols comprise a first treatment protocol and a second treatment protocol and wherein the inference model comprises a first inference model, the medium comprising instructions that when executed by a computer, further cause the computer to:

provide the plurality of images as inputs to the first inference model;

execute the first inference model to generate the probability of expansion of the vessel for the first treatment protocol;

provide the plurality of images as inputs to a second inference model; and execute the second inference model to generate the probability of expansion of the vessel for the second treatment protocol.

19. The computer-readable storage medium of claim 16, wherein the inference model is a convoluted neural network (CNN) and wherein the CNN is trained with a training set comprising a plurality of sub-sets of training images, each of the sub-sets of training images comprising multidimensional and multivariate images of a vessel or of a plurality of vessels, wherein the training images of each sub-set are associated with a probability of vessel expansion for each of the plurality of treatment protocols based on simulated treatment outcomes of the plurality of vessels.

20. The computer-readable storage medium of claim 19, the graphical information element comprising a graph with a plurality of plots, wherein each plot of the plurality of plots is associated with a treatment protocol of the plurality of treatment protocols and indicates the identified probability of expansion relative to the treatment parameter.

* * * * *